March 26, 1940.  C. B. HUNTMAN  2,195,331
STABILIZER SHOCK ABSORBER FOR MOTOR CARS
Original Filed June 17, 1936
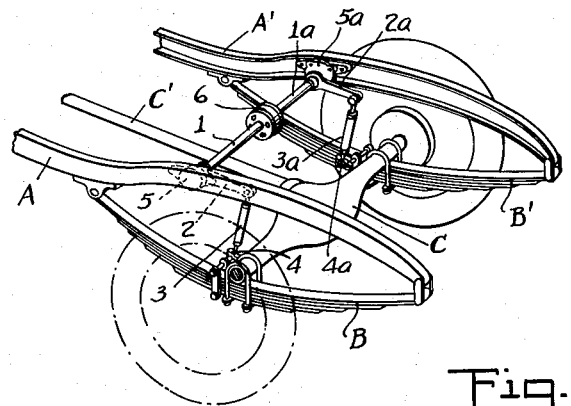
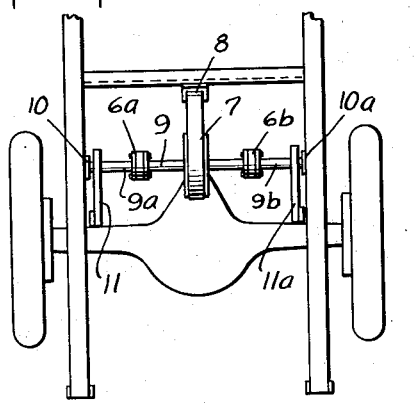
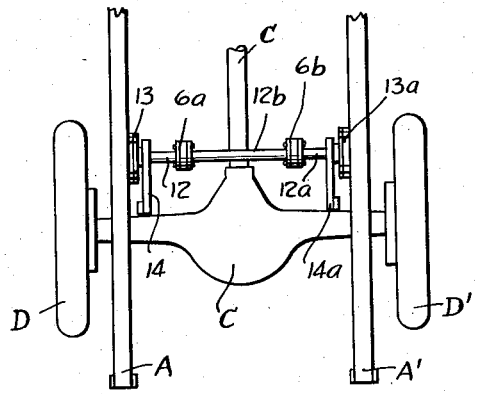
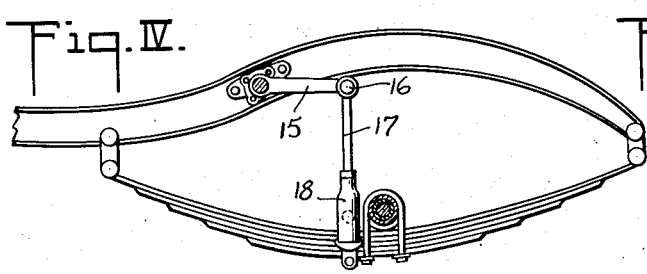
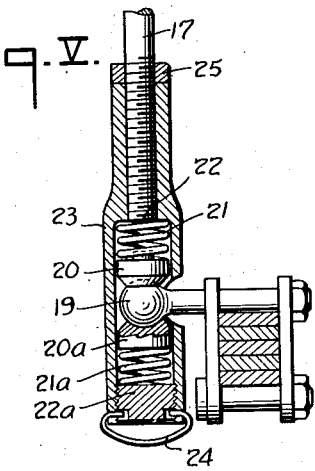
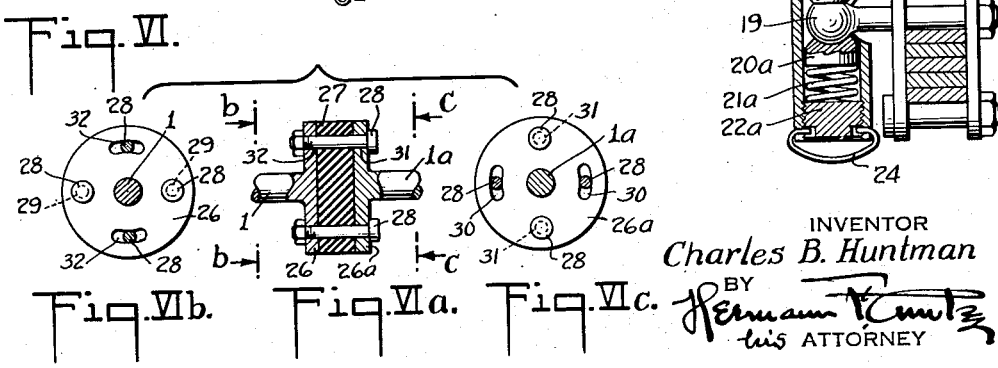
INVENTOR
Charles B. Huntman
BY
his ATTORNEY Patented Mar. 26, 1940

2,195,331

UNITED STATES PATENT OFFICE 2,195,331

STABILIZER SHOCK ABSORBER FOR MOTOR CARS

Charles B. Huntman, Plainfield, N. J.

Application June 17, 1936, Serial No. 85,765
Renewed August 24, 1939

7 Claims. (Cl. 267—11)

This invention relates to the equalizing or balancing of shocks such as are involved in motor cars when the wheels on one side are displaced by the uneven contour of the road, or when centrifugal strain tends to careen the body when a car at speed is deflecting its course. It involves the absorbing of such shocks or strains, balancing the effect of the strains on both sides of the car, dampening the reaction of any wheel or body displacement due to such shocks or unequal force on opposite sides of the car, and various other advantages which will appear from the more detailed description hereinafter set forth and be pointed out in the claims.

In general, it relates to mechanism or apparatus, or car equipment which aims to prevent side-sway of the body or of the entire sprung mass when rounding curves at speed, and to prevent or minimize side-rocking or listing or rolling of the car due to uneven road surface, particularly when wheel or wheels on one side engage obstacles or ruts different in magnitude from those engaged by the wheel or wheels on the opposite side.

This particular application involves apparatus or structure to accomplish such advantageous results through instrumentalities transmitting across the car the effect of vertical displacement or unequal vertical displacing forces on the wheels on opposite sides of the vehicle, in order to stabilize the car in travel, with a structure or combination in which the cross car force-transmitting means may be readily applied or removed, and in combination therewith means to cushion slight momentary displacements of an axle, so that they are absorbed without transmitting vibration to the body.

This application is a continuation in part of my co-pending application Serial No. 725,432 filed May 14, 1934, now Patent No. 2,089,263. This application also involves the inventions set forth in my application for patent August 24, 1925, which has become Patent No. 1,971,957, and involves variations or species relating thereto and to the subject-matter set forth in my Patents Nos. 1,971,960 and 1,971,961.

In my co-pending application Serial No. 725,452 cross car force transmitting means for stabilization included a coupling or a plurality of parts to permit assembly and detachment without removal of shock-absorber elements or shock arm and its connection with the axle, and in certain forms the present invention involves coupling or couplings that include rubber cushioning means of a nature that will absorb momentary slight vibration. In other forms the case relates to the structure shown in my original patent issued on application of August 24, 1925, in which the connection of the shock arm with the axle means involves the same flexibility as therein shown, and means for absorbing momentary displacements to a predetermined limited degree at the unsprung mass connection, to avoid the transmission of vibration to the combined shock-absorber means and cross car connections. Both of these forms were made and successfully used by me before the filing of my said application August 24, 1925.

In the forms of my invention herein more specifically set forth, the stabilizer-shock-absorber equipment is supplemented by means to resiliently absorb such slight momentary displacements of one axle end, or to absorb the vibration due to both wheels passing simultaneously a very slight ridge or depression of the roadway, either by absorbing such slight shocks to a predetermined limited degree at the sprung mass, or to absorb them in the oscillating parts to prevent their transmission to the body, and therefore more fully providing for ride-ease of the sprung mass. They also provide for the accommodation of irregularities in movement of oscillating parts that might otherwise cause binding or undesirable wear of parts, without affecting the main cross car stabilizing shock-absorber function of my basic invention.

In the accompanying drawing I have illustrated various forms of my invention, in which:

Fig. I is a perspective view from one side at the rear, of the rear portion of an automobile chassis containing my invention.

Fig. II is a plan view of the rear portion of a chassis showing modified arrangement for some of the parts.

Fig. III is a similar plan view showing another modified form as to arrangement of certain of the parts.

Fig. IV is a side elevation of the rear end of one sill or frame member and main spring with interconnecting shock and stabilizing means.

Fig. V is a view partly in section, on an enlarged scale, of a vibration absorption means at the connection between the shock arm link with the axle means.

Fig. VI is a fragmentary view of a cross car stabilizer bar showing a form of coupling for cushioning slight vibration, as indicated on the other views, but on a larger scale, in which VI$^a$ is a side elevation of the coupling, VI$^b$ and VI$^c$ are end views of the coupling from opposite side.

The drawing shows A—A' two sills or chassis frame side members, B—B' the main springs one on either side, C rear axle housing, C' a drive shaft or torque-tube connecting with the housing and driving axle, D—D' are road wheels.

A cross car stabilizing bar consists of parts 1—1ª with an intermediate resilient or cushioning coupling 6 providing slight lateral flexibility, and at each sill respectively is a shock-absorber 5, 5ª, while associated with the torque-bar parts and the shock-absorber parts are shock arms 2—2ª connected with links 3—3ª having a flexibility connection with axle means 4—4ª.

In Fig. II a single shock-absorber means 7 has one element secured to the frame, as at 8, by support at a cross member interconnecting the sills, and the other cooperating shock-absorber element mounted on a part 9 of the cross car torque-bar which is associated with the axially aligned sections of the cross bar 9ª—9ᵇ by cushioning couplings 6ª—6ᵇ, which in turn are mounted in bearings 10—10ª on the side frame members and support shock arms 11—11ª, being rigidly secured thereto so that oscillating movement of the arms is transmitted to the torque-bar and shock-dampening or recoil-dampening at the shock-absorber 8 is effective on both of the shock arms 11—11ª.

In Fig. III a cross car force-transmitting means is shown as a torque-bar in three sections in which the end sections 12—12ª are secured to and cooperate with the shock-absorbers 13—13ª and shock arms 14—14ª. The centre section 12ᵇ of the torque-bar is connected at either end with the end sections of the torque-bar by couplings 6ª—6ᵇ.

In Fig. IV one of the two shock-arms 15 may be an element of the shock-absorbers, as in Figs. I and III, or may be attached to the torque-bar near its ends, as in Fig. II, and it connects through a flexible joint 16 with link 17, which at its other end connects with the axle or axle housing with a flexible joint 18. One form of the flexible joint, shown on a larger scale in Fig. V, consists of ball 19 secured to the axle means in a manner causing its displacement with any displacement of the wheels with substantially the same magnitude of vibration or displacement of the wheels. Above and below the ball 19 are bearing-cups 20—20ª pressed against the ball 19 by springs 21—21ª having a predetermined limited degree of compression and backed up on a seat 22 in the recess in the casing 23, while the other spring is backed up by the screw cap 22ª threaded into the otherwise open end of the casing or sleeve 23, and may be locked after the setup for proper adjustment by the spring 24 engaging the castellated or similar end to the cap 22ª. The tubular casing 23 is screwed to the end of the link bar 17 and locked in adjusted position by the nut 25.

In Fig. VI the form of coupling involves flange 26 rigidly secured to the end of one section of the torque-bar, such as 1, while the flange 26ª is secured rigidly to the end of a juxtaposed torque-bar section, such as 1ª. Between the two flanges is a substantial or thick rubber cushion 27, through which four bolts 28 pass through perforations closely fitting the bolts. Two of the bolts, diametrically opposite, pass through holes 29 in the flange 26 and into the slots 30 in the flange 26ª, while the other two diametrically opposite disposed bolts 28 pass through holes 31 in flange 26ª and through slots 32 in flange 26. The bolts 28 may thus move in the slots in one flange but are resisted by their close fit in the other flange, with their heads and nuts, and washers if desired, sliding on the outer surface of the flange where they penetrate the slot, so that a limited predetermined slight rotary movement of one section of the torque-bar is permitted with respect to the other with the bolts engaging the rubber cushion 27, and thereby absorbing slight vibrations without transmitting the same through the entire torque-bar. While thus absorbing vibration from one shock arm and cushioning the transmission to the shock arm or shock-absorber elements at the opposite side of the car, it provides a flexible means to absorb inequalities during the functioning motion of the equipment due to any slight disalignment or springing of the parts.

I claim:

1. In a motor car stabilizer-shock-absorber equipment having a single shock-absorber, force-transmitting means transversely of the car from said shock-absorber to each side of the car at the sprung mass, a cushioning means in each of said cross car force-transmitting means so constructed and arranged whereby relatively slight vibration will be absorbed without transmission of shock to the shock-absorber.

2. In a motor car having sprung and unsprung masses, stabilizer-shock-absorber equipment having a single shock absorber, force-transmitting means transversely of the car from said shock-absorber to each side of one of said masses, a cushioning means in said cross-car force-transmitting means, so constructed and arranged whereby relatively slight vibration will be absorbed without transmission to the sprung mass.

3. A motor car stabilizing and shock absorbing equipment, comprising cross-car force-transmitting means having adjacent either end laterally extending rigidly associated lever arms, a single shock-absorber operatively associated with said cross-car force-transmitting means, a link pivoted to each of said lever arms and yielding means embodied in each link whereby slight road-shock is absorbed in said links, with limit to said slightly yielding means whereby beyond a predetermined limit displacement through road-shock or centrifugal force is transmitted from side-to-side through the cross-car force-transmitting means and dampened by said single shock-absorber.

4. A swaybar link assembly in a stabilizer equipment interconnecting the sprung mass and the unsprung mass of a motor car, comprising a torsion bar oscillatably supported at one of the masses rigidly associated laterally projecting extensions adjacent opposite ends of the torsion bar forming arms, pivot bearings at the end of said arms, links each having a hollow end portion and having openings through one side of the hollow end portion for receiving a shock-resisting head, means rigidly associating said head with the other mass, resilient inserts in said link adjacent said head held in said hollow portion of each link so constructed and arranged whereby a predetermined limited vibration of the mass associated with the head is absorbed and beyond the limited vibration movement is imparted to the link to actuate the torsion bar and effect stabilization between the two masses.

5. In a motor car stabilizing equipment interconnecting sprung and unsprung masses, a swaybar and link assembly comprising a torsion bar supported on one side of said masses, rigidly associated laterally projecting extensions at opposite ends of said torsion bar forming arms, bearing heads at the end of each arm, a link attached at each of said lever bearing heads and having in each link a hollow end portion, a lateral opening in each of said hollow end portions for receiving a shock-transmitting head rigidly associated with the other mass of the car, and resilient means adapted to absorb predetermined slight vibration of the shock-transmitting head secured under compression within the hollow end portion of each link in engagement with the opposite sides of the shock-transmitting head, so constructed and arranged whereby displacement of the head beyond the predetermined vibration-absorption amplitude imparts motion to the link causing the stabilizing function of the torsion bar in both directions of relative movement of the sprung and unsprung masses.

6. A swaybar for motor cars having sprung and unsprung masses, comprising a single shock-absorber, cross-car force-transmitting means operatively associated with said single shock-absorber and mounted on one of said masses, a lateral lever adjacent each end of said cross-car force-transmitting means, a link articulated to the end of each lever, and limited yielding means adapted to absorb slight vibration at one of said masses before the transmission of cross-car stabilizing movement from side-to-side of said car.

7. A stabilizer for automobiles, having sprung and unsprung masses, a single shock-absorber, cross-car force-transmitting means cooperating with said shock-absorber, limited vibration absorbing means in said cross-car force-transmitting means, and arms adjacent the sides of one of said masses rigidly associated with the cross-car force-transmitting means, and links from the arms to the other mass articulated to accommodate an amplitude of motion between said masses controlled by the cross-car force-transmitting means.

CHARLES B. HUNTMAN.